(12) United States Patent
Mookherjea et al.

(10) Patent No.: US 10,114,269 B2
(45) Date of Patent: Oct. 30, 2018

(54) HETEROGENEOUS WAVEGUIDES AND METHODS OF MANUFACTURE

(71) Applicant: The Regents of the University of California, Oakland, CA (US)

(72) Inventors: Shayan Mookherjea, La Jolla, CA (US); Marc Savanier, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/550,493

(22) PCT Filed: Feb. 11, 2016

(86) PCT No.: PCT/US2016/017467
§ 371 (c)(1),
(2) Date: Aug. 11, 2017

(87) PCT Pub. No.: WO2016/130754
PCT Pub. Date: Aug. 18, 2016

(65) Prior Publication Data
US 2018/0031949 A1 Feb. 1, 2018

Related U.S. Application Data

(60) Provisional application No. 62/114,884, filed on Feb. 11, 2015.

(51) Int. Cl.
*G02F 1/377* (2006.01)
*G02B 6/122* (2006.01)
(Continued)

(52) U.S. Cl.
CPC ......... *G02F 1/3775* (2013.01); *G02B 6/1228* (2013.01); *G02F 1/134309* (2013.01);
(Continued)

(58) Field of Classification Search
CPC ............... G02F 1/3544; G02F 1/3775; G02F 2006/12097; G02B 6/1228
See application file for complete search history.

(56) References Cited

U.S. PATENT DOCUMENTS 5,028,107 A 7/1991 Bierlein et al.
5,106,211 A 4/1992 Chiang et al.
(Continued)

OTHER PUBLICATIONS

Rabiei, Payam et al., "Heterogeneous lithium niobate photonics on silicon substrates," Optics Express vol. 21, No. 21, pp. 25573-25581 (Oct. 2013).*

(Continued)

*Primary Examiner* — Daniel Petkovsek
(74) *Attorney, Agent, or Firm* — Stuart H. Mayer; Mayer & Williams PC

(57) ABSTRACT

A heterogeneous waveguide is configured to achieve a nonlinear optical interaction, the waveguide including at least two materials in cross-section. The first material may or may not be poled or patterned and generally has a nonlinear optical property for generating at least one new frequency by mixing two of a plurality of input optical waves, and at least one of the other (second) materials is patterned for defining a waveguide mode in the cross-section, and for achieving phase-matched interactions of the waves along the propagation direction. Alternatively, the second material may be employed in increasing the modal confinement and improving efficiency. The optical modes are distributed between the two or more materials (e.g., in a hybrid mode). Implementations described also include methods of fabricating the heterogeneous waveguide.

21 Claims, 8 Drawing Sheets

(51) Int. Cl.
*G02F 1/1343* (2006.01)
*G02B 6/12* (2006.01)
*G02F 1/35* (2006.01)

(52) U.S. Cl.
CPC .. *G02F 1/3544* (2013.01); *G02B 2006/12097* (2013.01); *G02F 2001/134381* (2013.01); *G02F 2001/3548* (2013.01)

(56) References Cited

U.S. PATENT DOCUMENTS

| | | | | |
|---|---|---|---|---|
| 5,295,218 | A * | 3/1994 | Agostinelli | G02F 1/3775 359/326 |
| 5,619,369 | A * | 4/1997 | Yamamoto | G02B 6/124 359/328 |
| 5,802,232 | A | 9/1998 | Bhat et al. | |
| 5,943,465 | A * | 8/1999 | Kawaguchi | G02B 6/10 117/73 |
| 6,229,828 | B1 | 5/2001 | Sanders et al. | |
| 6,301,273 | B1 | 10/2001 | Sanders et al. | |
| 6,388,799 | B1 | 5/2002 | Arnone et al. | |
| 6,798,795 | B2 * | 9/2004 | Yoo | B82Y 20/00 359/332 |
| 6,804,283 | B2 | 10/2004 | Scherer | |
| 6,927,895 | B2 * | 8/2005 | Ju | G02F 1/3775 359/332 |
| 6,970,276 | B2 * | 11/2005 | Kurz | G02F 1/3775 359/237 |
| 6,996,321 | B2 | 2/2006 | Sasaura et al. | |
| 7,194,174 | B2 | 3/2007 | Dridi et al. | |
| 8,660,391 | B1 * | 2/2014 | Fish | B82Y 20/00 359/484.03 |
| 9,778,543 | B1 * | 10/2017 | Zlatanovic | G02F 1/395 |
| 9,846,285 | B2 * | 12/2017 | Fish | G02B 6/4203 |
| 9,922,967 | B2 * | 3/2018 | Krasulick | H01L 25/50 |
| 2004/0202440 | A1 | 10/2004 | Gothoskar et al. | |
| 2004/0227986 | A1 | 11/2004 | Kurz et al. | |
| 2006/0251424 | A1 | 11/2006 | Nicholson et al. | |
| 2012/0264256 | A1 | 10/2012 | Dallesasse et al. | |

OTHER PUBLICATIONS

International Search Report and Written Opinion dated Jun. 24, 2016, issued in connection with corresponding International Application No. PCT/US2016/017467 (14 pages total).
Erny, C. et al. Mid-infrared difference-frequency generation of ultrashort pulses tunable between 3.2 and 4.8 μm from a compact fiber source. Opt. Lett. 32, 1138-1140 (May 1, 2007) (3 pages total).
Roussev, R.V. Optical Frequency Mixers in Periodically Poled Lithium Niobate: Materials, Modeling and Characterization. Ph.D. Dissertation, Stanford University (2006) (152 pages).
Tsutomu Yanagawa, Osamu Tadanaga, Yoshiki Nishida, Hiroshi Miyazawa, Katsuaki Magari, Masaki Asobe, and Hiroyuki Suzuki, "Simultaneous observation of CO isotopomer absorption by broadband difference-frequency generation using a direct-bonded quasi-phase-matched LiNbO3 waveguide," Opt. Lett. 31, 960-962 (2006) (3 pages total).
Asobe, M. et al. Multiple quasi-phase-matched device using continuous phase modulation of x(2) grating and its application to variable wavelength conversion. IEEE J. Quantum Electron., vol. 41, No. 12, pp. 1540-1547 (2005) (8 pages total).
Asobe, M. et al. Wavelength Conversion Using Quasi-Phase Matched LiNb03 Waveguides. IEICE transactions on electronics 88.3, 335-341 (2005) (7 pages total).
J. D. Bierlein, D. B. Laubacher, J. B. Brown, and C. J. V. D. Poel, "Balanced phase matching in segmented KTiOPO4 waveguides," in International Quantum Electronics Conference, A. Owyoung, C. Shank, S. Chu, and E. Ippen, eds., vol. 8 of OSA Technical Digest (Optical Society of America, 1990), paper QMC6. (2 pages total).
Essaian, S. "White Paper: Periodically-poled lithium niobate (tantalate) crystalline components for generation of blue-green light from InGaAs/GaAs diode and DPSS Laser". Spectra/us (2005). (11 pages total).

* cited by examiner

FIG. 6A  FIG. 6B  FIG. 6E
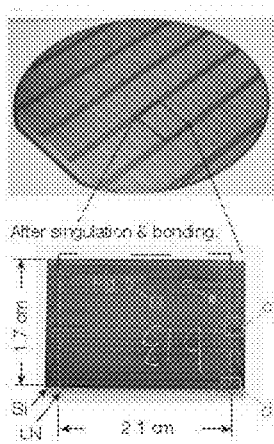
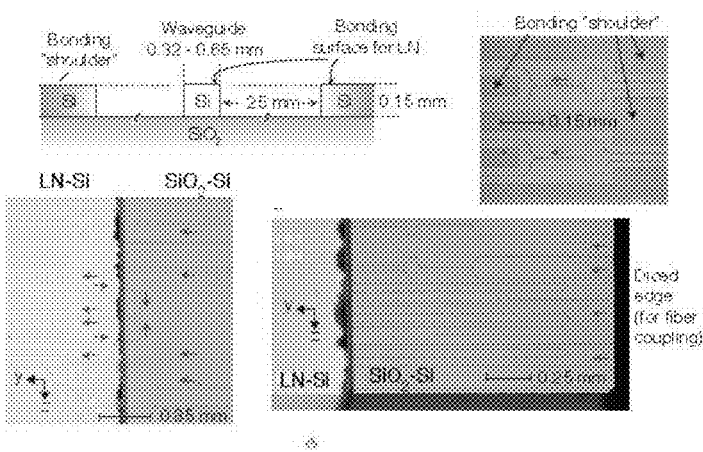
FIG. 6C  FIG. 6D

FIG. 7B  FIG. 7C  FIG. 7D

HETEROGENEOUS WAVEGUIDES AND METHODS OF MANUFACTURE

CROSS-REFERENCE TO RELATED APPLICATIONS

This application is a 371 of International Application No. PCT/US2016/017467, filed Feb. 11, 2016, entitled "HETEROGENEOUS WAVEGUIDES AND METHODS OF MANUFACTURE" which claims benefit of priority to U.S. Provisional Patent Application Ser. No. 62/114,884, filed Feb. 11, 2015, entitled "HETEROGENEOUS WAVEGUIDE AND METHODS OF MANUFACTURE", all of which are owned by the assignee of the present application and herein incorporated by reference in their entirety.

GOVERNMENT FUNDING

This invention was made with government support under ECCS-1201308 and ECCS-1307514 awarded by the National Science Foundation. The government has certain rights in the invention.

FIELD

The invention relates to the waveguides, and more particularly to heterogeneous waveguides and their methods of manufacture.

BACKGROUND

Waveguides have numerous applications in the field of optical signal processing, and optical signal processing is often accomplished through interactions of optical waves at different frequencies mediated by a plurality of nonlinear-optic tensor coefficients of a crystal. In some materials, of which uniaxial crystal lithium niobate is an example, a strongest (highest-magnitude) tensor coefficient of "$d_{33}$" requires that each of two input optical waves and a generated optical wave is polarized along a direction defined by an axis of the crystal.

However, refractive indexes of such crystals are dependent on wavelength. In one example, each of the two input optical waves and the generated optical wave include discrete wavelengths. Therefore each of the waves includes discrete refractive indices, and hence propagate at discrete velocities with respect to each other. As the waves propagate, phase fronts associated with each wave become separated from each other (a phenomenon called walk-off, or phase-mismatch), and incremental changes in amplitude of each of the waves that are incurred in any sub-section of propagation (in terms of distance through the crystal) do not add up cumulatively with changes from earlier or subsequent sections. Consequently, over any significant distance of propagation, power levels of the input optical waves do not change significantly and output power in the generated optical wave is weak relative to the power levels of the input optical waves. Such phase-mismatched operation is undesirable for nonlinear optics.

Various techniques have been used to achieve phase-matching in crystals and waveguides. Among the techniques, quasi-phase-matching (QPM) is widely used, where poling orientation of a nonlinear crystal is periodically reversed along a direction of propagation. The poling may include a spatial periodicity L selected such that $2\pi/L$ is equal to the phase-mismatch (modulo integer multiples of $2\pi$). Compensating for the phase mismatch (through QPM or other techniques) results in power of the generated optical wave growing cumulatively with propagation distance. Compared to the phase-mismatched case, output power may be higher in this phase-matched example by several orders of magnitude. However, a poled crystalline material may have a reduced nonlinear coefficient(s) compared to the unpatterned version of the same material.

Quasi Phase Matching (QPM) is often accomplished by reversing polarization of nonlinear coefficients periodically in the nonlinear material. Periodically-poled lithium niobate (PPLN) is Lithium Niobate that has been quasi-phase matched. However, the poling process increases fabrication complexity, and thus fabrication of quasi-phase-matched waveguides by periodically poling crystals such as Lithium Niobate and Lithium Tantalate may be challenging and not be amenable to widely-used fabrication techniques. In addition, the fabrication technique of diffusion may not allow for fine features such as: gradations in the pitch of the QPM period to accurately extend, confine and/or shape the range of wavelengths over which the nonlinear interactions occurs, or formation of interleaved or multi-periodic gratings which may simultaneously achieve QPM for multiple frequency bands.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Thus, from the above, what is needed is a more efficient waveguide structure configured to utilize any desired nonlinear coefficient of a material for nonlinear optical wave interactions without requiring patterning, poling, domain inversion, and/or the like for the material. What is also needed is a waveguide fabrication process that reduces costs, reduces fabrication complexity, and allows for fine features. Systems and methods according to present principles meet the needs of the above in several ways.

A heterogeneous waveguide is described which is configured to achieve a nonlinear optical interaction, the waveguide including at least two materials in the cross-section. The first material may or may not be poled or patterned and has a nonlinear optical property for generating at least one new frequency by mixing two of a plurality of input optical waves, and at least one of the other (second) materials is patterned for defining a waveguide mode in the cross-section. The patterning of the first material, if any, and/or of the second material, is also for achieving phase-matched interactions of the waves along the propagation direction. The optical modes are distributed between the two or more materials (e.g., in a hybrid mode),Implementations described also include methods of fabricating the heterogeneous waveguide.

In more detail, a heterogeneous waveguide is provided including a first material that may be uniform in composition, e.g., not etched, bored, patterned, or modified, or it may be configured through etching, boring, patterning etc. to provide optical mode localization in a transverse plane. The heterogeneous waveguide may be configured to provide increased optical mode localization (compared to a waveguide consisting of the first material alone) through a pattern in the second material.

In one aspect, the invention is directed towards a heterogeneous waveguide configured to achieve nonlinear optical interactions, the heterogeneous waveguide including at least two materials in a cross-section, a first material having a nonlinear optical property for generating at least one new frequency by mixing one or more input optical waves, and a second material being patterned for defining a waveguide mode in the cross-section, the second material configured to achieve phase-matched interactions of waves along a propagation direction, such that optical modes are distributed between the first and second materials.

Implementations of the invention may include one or more of the following. The first material may be selected as one that exhibits second order nonlinear optical susceptibility. The first material may be an unpatterned crystal, e.g., not etched, bored, patterned, poled, or modified. Alternatively the first material may be periodically poled. The pattern of the second material may be periodic. The heterogeneous waveguide may be configured to generate a new optical wave based at least in part on nonlinear optical interactions of at least two of a plurality of input optical waves. The first material may include an unpatterned crystalline thin-film of at least one of the following: Lithium Niobate (LiNbO3); Lithium Niobate (Li3NbO4); or Lithium Tantalate (LiTaO3). The second material may include a thin film of at least one of the following: silica nitride, silicon, silicon dioxide, a compound semiconductor, a polymer, SiC, or a III-V semiconductor selected from the group consisting of: GaAs, GaAlAs, InP, InSb, GaP, GaN, InGaAs, or InGaAsP.

The at least one periodic pattern may be configured along the direction of propagation of the input optical waves. The at least one periodic pattern may include a plurality of waveguide sections, where members of the plurality differ in or have discrete heights, weights, material structures, material compositions, or doping. The at least one periodic pattern may include at least one waveguide taper, the at least one waveguide taper configured to reduce at least one optical mode-mismatch, the optical mode-mismatch occurring between at least two waveguide sections. The heterogeneous waveguide may include at least one additional material.

The heterogeneous waveguide may be configured to generate at least one new optical or radio frequency based at least in part on two input frequencies. The one or more input optical waves may correspond to one of the following: an independent optical wave; or a spectral component of an optical pulsed waveform. The heterogeneous waveguide may be configured to divide at least one spectral component of at least one input optical wave into two or more generated frequencies that are phase matched. The heterogeneous waveguide may be configured to generate an optical parametric amplification of at least one of a plurality of input optical waves. The heterogeneous waveguide may be configured to upconvert or downconvert at least one input optical wave. The heterogeneous waveguide may be configured to generate a frequency comb through difference frequency generation of at least two of a plurality of distinct input optical waves, or at least two spectral components of at least one input optical wave. The heterogeneous waveguide may be configured to generate at least one radio frequency wave through difference frequency generation of at least two of a plurality of distinct input optical waves or at least two spectral components of at least one input optical wave.

In another aspect, the invention is directed towards a method for fabricating the heterogeneous waveguide, where the first material is bonded to the second material, and subsequently the second material is patterned. Alternatively, the second material is patterned, and subsequently the first material is bonded to the patterned second material.

In yet another aspect, the invention is directed to a method of fabricating a heterogeneous waveguide, including: depositing a thin film of a second material on a wafer including a thin film of a first material, the first material exhibiting second order nonlinear optical susceptibility; creating at least one periodic pattern in the second material, where the periodic pattern defines at least one optical mode area in a cross-section, the cross-section including at least part of the first material and at least part of the second material; and where the second material is discrete or is different from the first material.

Implementations of the invention may include one or more of the following. The first material may include at least one of the following: Lithium Niobate (LiNbO3); Lithium Niobate (Li3NbO4); or Lithium Tantalate (LiTaO3). The second material may include at least one of the following: silica nitride, silicon, silicon dioxide, a compound semiconductor, a polymer, SiC, or a III-V semiconductor selected from the group consisting of: GaAs, GaAlAs, InP, InSb, GaP, GaN, InGaAs, or InGaAsP, in crystalline, polycrystalline or amorphous forms. The method may further include etching the second material to produce a rib waveguide structure. The method may further include creating the periodic pattern along an intended direction of optical wave propagation, the pattern configured to achieve phase matching of a plurality of optical waves propagating through the heterogeneous waveguide.

In yet another aspect, the invention is directed towards a method of fabricating a heterogeneous waveguide, including: depositing a thin film of a second material on a handle wafer, the handle wafer including a handle layer; creating at least one periodic pattern in the second material; bonding a thin film of a first material to the second material, the first material exhibiting second order nonlinear optical susceptibility, where the thin film of the first material is uniform in composition or is periodically poled; removing at least part of the handle layer to expose at least one optical mode area in a cross-section, the cross-section including at least part of the first material and at least part of the second material; where the second material is discrete or is different from the first material.

Implementations of the invention may include one or more of the following. The first material may be bonded to a second handle wafer prior to the bonding of the first material to the second material, the second handle wafer including a second handle layer. The method may further include removing at least part of the second handle layer to define an air-top-clad region, the region exposing at least one optical mode or optical mode area in cross-section, the cross-section including at least part of the first material and at least part of the second material.

Advantages of the invention may include, in certain embodiments, one or more of the following. Systems and methods provide, in some implementations, a new chip-scale, lower cost/high efficiency hybrid structure waveguide with applications in mid-infrared spectroscopy, free-space communications, laser ranging, imaging, illumination and sensors. The provided waveguide is efficient and easy to fabricate. The waveguide may enable greater conversion efficiency of input frequencies. Greater conversion efficiency may enable usage of lower pump power of at least one input optical wave. Furthermore, greater conversion efficiency may enable a shorter waveguide length.

Other advantages will be understood from the description that follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

FIGS. 6(a)-6(e) illustrate hybrid LN-Si photonic circuits.

FIGS. 7(a)-7(d) illustrates another hybrid LN-Si optical circuit.

Like reference numerals refer to like elements throughout. Elements are not to scale unless otherwise noted.

DETAILED DESCRIPTION

Figure 1A:
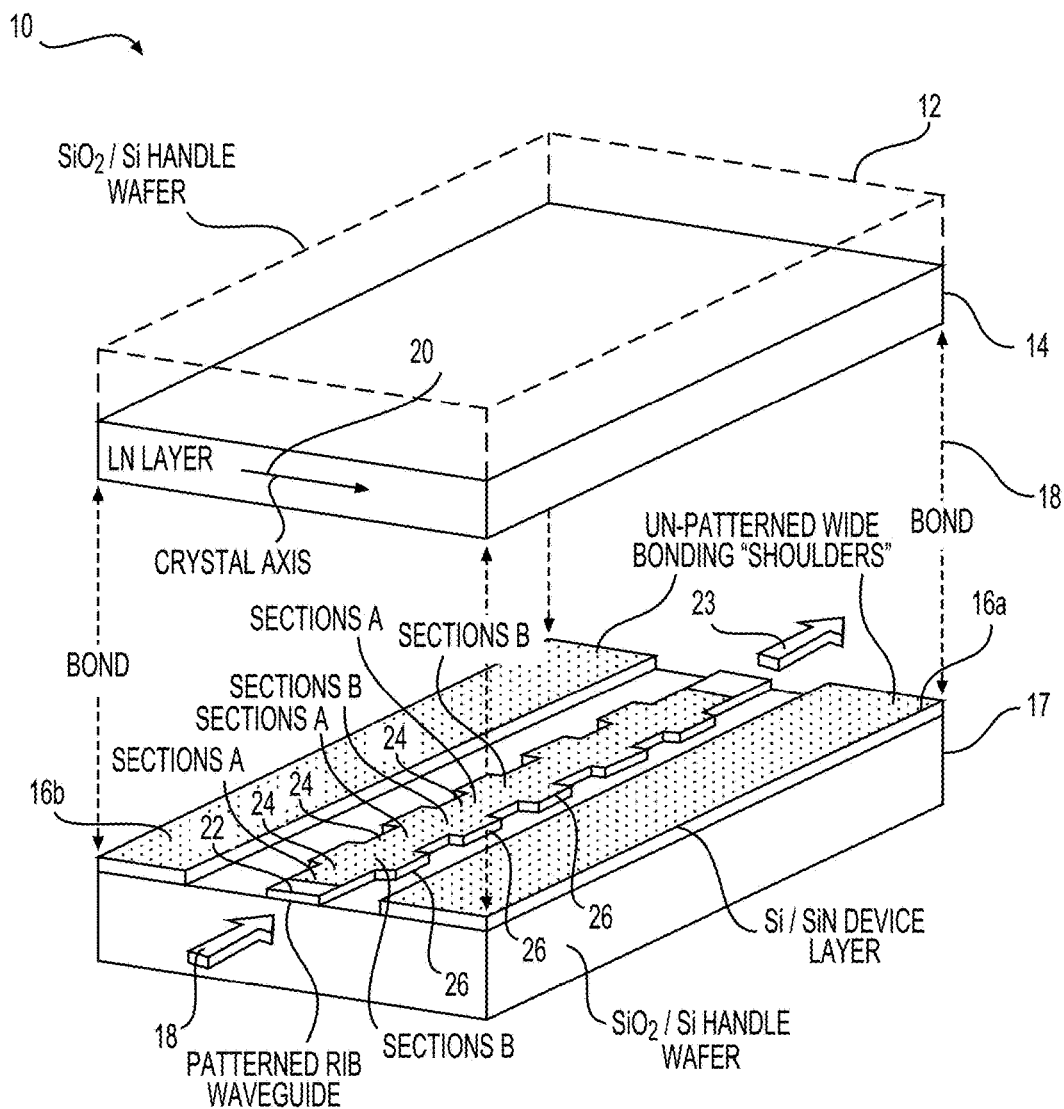
FIG. 1A shows a perspective view of an illustrative hybrid waveguide.
Figure 2:
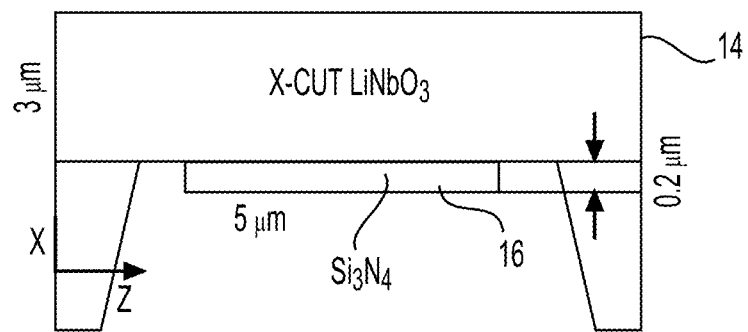
FIG. 2 shows the waveguide of FIG. 1 in cross-section.

FIG. 1A shows a hybrid waveguide in cross-section, in which transverse confinement and axial phase matching are defined by a lithographically patterned rib of a bonded material such as silicon nitride or silicon. In particular, a first material 14 such as LN is illustrated coupled to a second material 16 (a device layer indicated by unpatterned regions called "shoulders" 16a, 16b, and a patterned rib waveguide 22 including "A" sections 24 and "B" sections 26). The second material is silicon, silicon nitride or other materials described below. The first material 14 may be coupled to the second material 16 by bonding 18. FIG. 2 shows the materials in cross-section, with exemplary material types, although other material types will also be understood as are described below. Handle wafers 12 and 17, e.g., $SiO_2$/Si, are illustrated coupled to the first and second materials, respectively, for fabrication. A crystal axis 20 is illustrated in the first material 14. Without loss of generality, the crystal axis vector may point in other directions. An input wave, which is shown schematically and which may include one or a plurality of input waves, or spectral components of an optical pulsed waveform, is illustrated incident on the waveguide with the direction of propagation shown by arrow 18, and the direction of propagation of the output wave is illustrated by arrow 23.

The shoulders described above can serve as flat surfaces for increasing the bonded area (which are here called "bonding pads" to describe their purpose), and are positioned at the same height as the Si rib features.

According to the above, a heterogeneous waveguide according to systems and methods of present principles may include a first material that may be uniform in composition (e.g., not etched, bored, patterned, or modified), or configured to provide optical mode localization in a transverse plane. Additionally or alternatively, the waveguide in the first material may be periodically poled along the direction of optical propagation. The heterogeneous waveguide may be configured to provide increased optical mode localization through a pattern in a second material. The heterogeneous waveguide may enable greater conversion efficiency of input frequencies. Greater conversion efficiency may enable usage of lower pump power of at least one input optical wave. Furthermore, greater conversion efficiency may enable a shorter waveguide length.

Figure 1B:
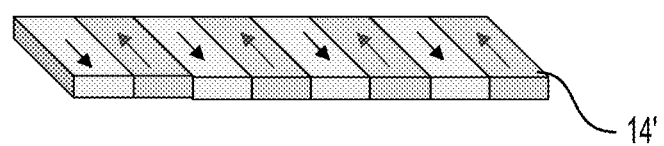
FIG. 1B shows a periodically poled first material.

The first material may include any material associated with a second-order nonlinear optical coefficient. Furthermore, the first material may include any crystal including the following characteristics: a tensor coefficient exhibiting the highest-magnitude of a plurality of second-order nonlinear optical tensor coefficients, and a wavelength-dependent refractive index. The first material may be configured to provide non-linear optical interactions of at least two of a plurality of input optical waves, or two or more spectral components of at least one input optical wave. The first material may be periodically poled to phase-match the nonlinear interaction of at least two of a plurality of input optical waves or two or more spectral components of at least one input optical wave, or the interaction of at least two of a plurality of input optical waves and at least one radio-frequency wave. For example, periodically poled lithium niobate (PPLN) may be employed. See, e.g., FIG. 1B, which illustrates a periodically poled first material 14'.

The first material may include a wafer including a finite length, a finite width, and a specific thickness. The finite length of the first material may be based at least in part on an anticipated electric field strength of at least one of the plurality of generated optical or radio-frequency waves. The wafer may be unmodified after it is sliced from a crystal. The crystal may include a specific diameter. The first material may be surrounded by semi-infinite regions of lower-index cladding (e.g., including air) above and below the first material where the second material is not present.

The second material may be any material that is not associated with a significant nonlinear optical coefficient compared to the first material. The second material may, in some cases, not provide a nonlinear interaction of at least two of a plurality of input optical waves. The second material may be any material that may be patterned through lithography, etching, sawing, self-assembly, a combination thereof, and/or the like. The second material may be selected based at least in part on a target refractive index of the second material. The refractive index may be a target based at least in part on anticipated input optical waves, a desired generated optical or radio-frequency wave, anticipated linear interactions of optical waves, anticipated nonlinear interactions of optical waves, combinations thereof, and/or the like. The second material may include at least one dopant, which may be configured to alter a linear property and/or a nonlinear property of the second material. Furthermore, a dopant may be configured to alter at least one waveguide of a plurality of waveguides patterned in the second material. Those skilled in the art will recognize that other methods exist to achieve a discrete or different linear and/or nonlinear refractive index in at least one waveguide and/or at least one waveguide segment.

The second material may be configured to provide finite lateral extent (e.g., a finite width of the intended optical mode). A shape of the intended optical mode in the transverse cross-section including the first material and the second material may be controlled by a width and/or height of the second material in close proximity to the first material. An effective refractive index of the intended optical mode may also be controlled by a width and/or height of the second material in proximity to the first material. The shape and the effective refractive index of the intended optical mode may also be controlled by the refractive indices of the selected materials including at least the first material, the second material, and the cladding material.

New optical or radio frequency waves may be generated with or without periodically poling or patterning the crystals in the first material by the nonlinear interaction of at least two of a plurality of optical waves, or the interaction of at least two of a plurality of optical waves and at least one radio-frequency wave.

A pattern in the first and/or second material may be optimized to provide a single optical mode corresponding to each of a plurality of expected frequencies of optical or radio frequency waves propagating through the waveguide. The pattern may be configured to establish phase-matching of at least one input optical or radio frequency wave with at least one generated optical or radio frequency wave. Similarly, a grating in the first and/or second material may be configured to reduce phase mismatch of spectral components of at least one input optical or radio frequency wave and/or at least one generated optical or radio frequency wave. For example, spectral components may include wavelengths of 1 μm, 1.5 μm, and/or 3-6 μm. A periodic pattern in the second material may be configured to establish a phase-matching relationship between at least one input optical wave with at least one generated optical wave. The periodic pattern may include at least two discrete or different segments. The at least two discrete or different segments may be repeated along an expected direction of propagation of at least two optical waves. Here the term 'discrete' segments are used to refer to segments that differ in one or more of the following: height, width, material structure, material composition, or doping.

Difference frequency generation (DFG) of a wave including a third DFG wavelength, given two input spectral components of wavelengths 1 and 2 in a heterogeneous waveguide, may be expressed as $1/\lambda_1 - 1/\lambda_2 = 1/\lambda_{DFG}$. In this example, the pattern in the second material may define two discrete segments: segment A and segment B. The segments may repeat along the direction of propagation forming, for example, a periodic pattern (ABAB . . . ). In each segment A, each of the two input components may transfer at least a portion of power to the generated wave which grows in power. However, since waves at different frequencies propagate through the materials with different phase velocities, the two input components and the generated wave may acquire a relative phase mismatch. The intensity of the wave at the DFG wavelength may therefore not increase significantly with increasing propagation distance along the heterogeneous waveguide.

A length of each segment A, $L_A$, may be configured to generate an optical or radio frequency wave through a nonlinear interaction of input components. If the length $L_A$ is selected according to the phase mismatch of the interacting waves, $\Delta k$, by the relation $L_A = \pi/\Delta k$, after propagating this length of each segment A, the generated wave may reach its maximum power level. Because of an uncompensated phase mismatch of the two input components and the generated wave, extending the length of each segment A beyond $L_A$ will result in a decrease in power of the generated wave. Therefore, in this example, the generated wave at each segment A ending will have a different phase relationship relative to the two input components at each segment A beginning.

Segment B has a different waveguide structure than Segment A. Therefore, the rate of phase accumulation in the generated optical or radio frequency wave in Segment B is different from that of Segment A. Through propagation through a particular length after Segment A, Segment B in this example may allow the relative phase of the two input components and the generated wave to re-establish via propagation and/or interaction. The re-establishment may provide a correct phase relationship needed in the following Segment A, thus enabling cumulative power transfer from the input components to the generated wave, the power transfer in this example configured to take place in each segment A.

A length of segment B, $L_B$, may be configured to re-establish, after an anticipated propagation through segment B, a relative phase match between the two input components and the generated wave as is anticipated at a segment A beginning, the segment A preceding the segment B. Therefore, the length of segment A may, in some cases, not be equal to the length of segment B.

A magnitude and/or sign of effective nonlinear coefficients describing an interaction of the two input components and the generated wave may be different in segment B from effective nonlinear coefficients describing an interaction in segment A. The difference may be attributed to a change in height and/or width, of crystalline orientation, of temperature, or any other material property of the second material between repeated segments. Furthermore, this difference may be obtained with uniformity of the first material throughout the repeated segments of the second material.

The difference of segment B from segment A may be attributed to a change in the nonlinear optical coefficient of segment B with regard to segment A, e.g., by poling the first material periodically. Furthermore, this difference may be combined with a change of any material property of the second material between repeated segments.

In this example, when effective nonlinear coefficients in segment A and segment B have a similar sign, magnitudes of the effective nonlinear coefficients are configured to be weaker.

In this example, when effective nonlinear coefficients in segment A and segment B have opposite signs, magnitudes of the effective nonlinear coefficients in segment B may be configured to be weaker, equal to, or stronger than magnitudes of the effective nonlinear coefficients in segment A.

As one example, two input optical waves of radian frequency $\omega_2$ and $\omega_3$ may generate a new wave of radian frequency $\omega_1$ such that $|\omega_2 \pm \omega_3| = \omega_1$.

As a further example, a heterogeneous waveguide configured to operate as a frequency comb generator may be configured to accept a plurality of spectral components, the spectral components may be provided in one input optical wave, in separate input optical waves, in combinations thereof, and/or the like. The heterogeneous waveguide may be further configured to perform difference frequency generation, sum frequency generation, combinations thereof, and/or the like. By way of example and not limitation, frequency combs may be generated in the wavelength range of 3.0 μm-6.0 μm.

Figure 3A:
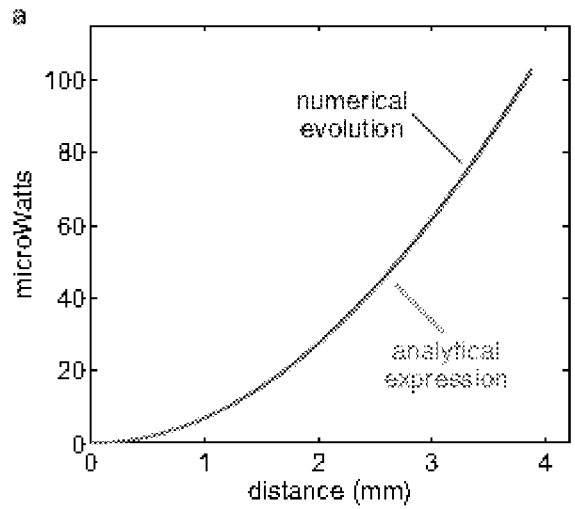
FIGS. 3(a) and 3(b) illustrate growth of a difference frequency field as a function of wavelength.
Figure 3B:
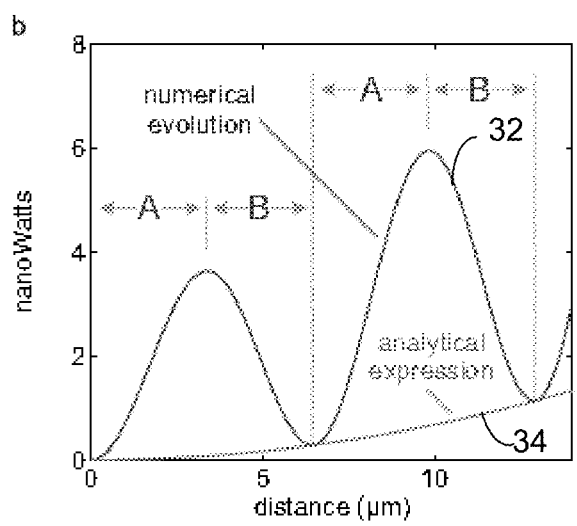
Figure 4:
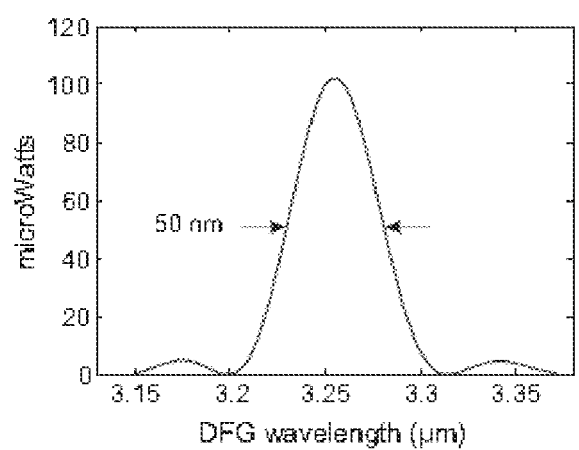
FIG. 4 illustrates a calculation of a generated DFG power versus wavelength.
Figure 5A:
FIGS. 5(a)-5(d) illustrate steps in a method of manufacturing an exemplary waveguide according to present principles.
Figure 5B:
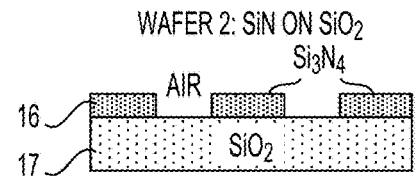
Figure 5C:
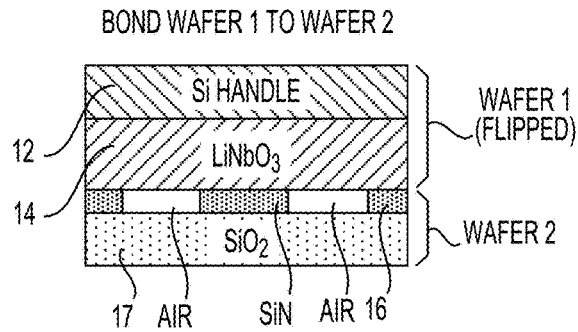
Figure 5D:
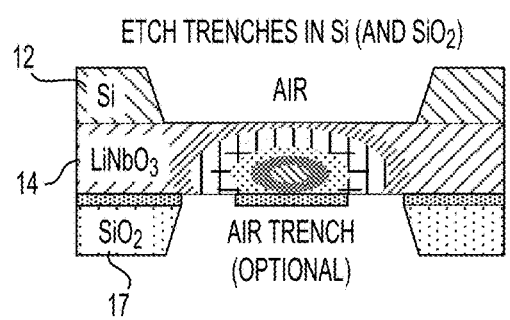

FIG. 3 illustrates growth of the difference-frequency field at a wavelength of 3.255 μm, generated by input waves (100 mW power each) at 1.05 μm and 1.55 μm. FIG. 4 illustrates calculation of the generated DFG power versus mid-IR wavelength $\lambda_1$ obtained for $\lambda_2 = 1050$ nm and $\lambda_3$ ranging from 1525 nm to 1575 nm, showing a full width at half maximum (FWHM) bandwidth of about 50 nm around 3.255 μm for a device according to present principles.

Those skilled in the art will recognize that any application achieved through periodically-poled lithium niobate may also be achieved through employment of a heterogeneous waveguide. By way of example and not limitation, applications of the heterogeneous waveguide may include: wavelength conversion, signal regeneration, tunable optical delay, dispersion compensation, time-division multiplexing, time-division demultiplexing, combinations thereof, and/or the like.

The second material may include a semiconductor. The semiconductor may be formed into electro-optic features such as: resistors, diodes, transistors, combinations thereof, and/or the like. Additional semiconductor materials may be added as necessary to achieve an electro-optic feature. The combination of a heterogeneous waveguide with electro-optic features may enable guiding and/or phase matching of at least two input optical waves to be electrically and/or thermo-optically varied. Electrical variation may be achieved through an applied direct and/or alternating current. Electrical variation may also be achieved through an applied direct and/or alternating voltage. Thermo-optic variation may be achieved through applied heat, heat transfer resulting from an applied current and/or voltage, heat transfer resulting from an optical input, combinations thereof, and/or the like. Use of electrical and/or thermo-optic variation may enable a heterogeneous waveguide to produce desired frequencies over a broader range. The heterogeneous waveguide may be configured as an electro-optic modulator though the employment of an alternating voltage.

In another aspect, and referring to FIG. 5, systems and methods according to present principles relate to fabrication of a heterogeneous waveguide where the same may be configured to keep a heterogeneous relationship between a first material and at least one second material. In a first step, indicated by FIG. 5(*a*), the first material indicated by Wafer 1 is cut and optionally formed with a handle, e.g., a Si handle 12. In FIG. 5(*b*), the second material indicated by Wafer 2 includes the formation of the device layer 16 on the SiO2 layer 17. FIG. 5(*c*) indicates the bonding of wafer 1 to wafer 2. Trenches may then be etched in the wafers for the creation of one or more devices, as illustrated in FIG. 5(*d*). The etching discussed in these figures may further include etching to produce a rib waveguide structure, e.g., in the second material, although the first material may also be patterned. Steps of the method may include the creation of a periodic pattern along the intended direction of optical wave propagation, the pattern configured to achieve phase matching of a plurality of optical waves propagating through the heterogeneous waveguide.

The first material 14 may be unpatterned (e.g., no poling, ion exchange, or domain inversion). The first material 14 may be unmodified after it is cut from a crystal. The thin film of the first material may be uniform in composition. The uniformity may simplify the fabrication process. The first material may include a nonlinear crystal. Additional materials may include at least one of a dielectric, a semiconductor, and/or a polymer. An unpatterned nonlinear crystal may reduce fabrication costs and complexity. At least one of the additional materials may be patterned (e.g., using lithography). The additional materials may include materials widely used in semiconductor manufacturing (e.g., silicon nitride, silicon dioxide or silicon) for which cost-effective, large-area, lithography techniques have been developed. The periodic pattern may be created through lithography, etching, sawing, drilling, combinations thereof, and/or the like.

The second material may be patterned into at least one waveguide structure. The at least one waveguide structure may be defined without any need to pattern the first material, although the same may be patterned in certain circumstances. Additional structures may be defined by lithography in the second material. For example, the additional structures may include input/output couplers, tapers, bends, splitters, directional couplers, microring resonators, microdisk resonators, Mach-Zehnder interferometers, combinations thereof, and/or the like. The additional structures may be defined without any need to etch the first material. The periodic pattern may be configured to compensate for a phase mismatch that may occur between at least two input optical waves propagating in the first material.

Etching may be performed to remove portions of the second material so that one or more transverse modes may be defined in the resulting cross-section.

Additional features may be patterned on either surface. For example, the additional features may include air-filled trenches, dielectric-filled trenches, polymer-filled trenches, metal electrodes, combinations thereof, and/or the like.

The phase-matching condition, if any, enabled by the periodic pattern may be changed or varied by thermal heating, thermal cooling, electronic carrier injection, electronic carrier depletion, combinations thereof, and/or the like. Therefore, wavelength(s) generated by any intended input wavelengths may be varied statically, dynamically, by combinations thereof, and/or the like.

The handle layer may be etched along with the second handle layer to define at least one suspended waveguide. Alignment of at least one etch of the handle layer and at least one etch of the second handle layer may, in some cases, not be uniform. A heterogeneous waveguide including a suspended waveguide may be mechanically supported away from an optical mode cross section.

Discrete structures may be fabricated on one substrate. The structures may be interconnected at the input side, the output side, and/or at intermediate locations by additional structures such as couplers, splitters and/or the like, formed in the second material.

As noted above, in some cases the shoulders or bonding pads may be employed to connect active devices which may also take advantage of, e.g., gold electrodes positioned directly on the LN thin film layer. For example, hybrid chips may be designed with smaller sized LN pieces, which combine traditional silicon photonic components with hybrid LN-Si photonic components on a monolithic platform. In addition, dopants and electrodes may be included as part of the Si chip, which could be used for electro-optic effects. Alternatively, electrodes can be fabricated on the LN layer after substrate removal.

Even though LN is not a CMOS compatible material, foundry fabrication technologies can be employed to create LN integrated optics. While LN has been a desirable material for its nonlinear and electro-optic properties, it is not been possible in the past to make compact and complex waveguide circuits as is possible nowadays in silicon photonics using precise and highly repeatable DUV lithography. Using the above techniques and devices according to present principles, hybrid building blocks may be constructed from which optical circuits can be assembled alongside traditional silicon photonics components. Chip scale direct bonding of chips that are a few centimeters square, e.g., the field size of a typical DUV stepper lithography system, may be employed with enough bond strength to permit dicing and simple packaging for test and measurement. A similar approach may also be applied to design and use optical circuits using other thin-film materials in place of LN, leveraging the advanced foundry fabrication capabilities of silicon photonics as a wave guiding template for the hybrid modes, eliminating the need to pattern the thin films.

For example, FIG. 6(a) illustrates silicon photonic components fabricated using DUV lithography. Singulated dies were bonded to diced pieces of an unpatterned LN wafer consisting of a thin film of x-cut LN, an $SiO_2$ substrate, and an LN handle. FIG. 6(b) shows a schematic of the cross section showing how waveguides and bonding shoulders, which are at the same height as the waveguides, are conveniently formed in one lithographic etch step on the silicon wafer. FIG. 6(c) shows an optical microscope image showing waveguides transitioning between the portion of the hybrid chip which is not covered by LN, and that which is bonded to LN. FIG. 6(d) illustrates optical components as defined in the $SiO_2$ clad Si section, or (FIG. 6(e)) in the LN-Si bonded section.

Figure 7A:
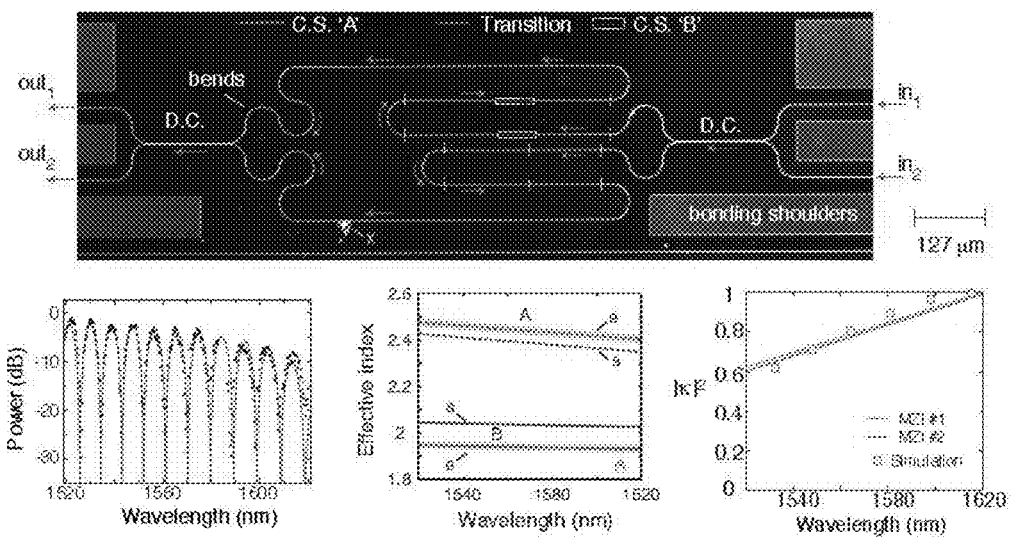

FIG. 7(a)-7(d) illustrates a hybrid LN-silicon optical circuit. FIG. 7(a) shows an optical microscope image of an interferometric hybrid LN-Si circuit (within the compact region labeled "FIG. 5" in FIG. 6(a)) which uses both waveguide cross-sections A and B, four adiabatic transitions (Transitions), two directional couplers (D.C.), and nineteen 90° bends in each light path. The image is shown using a simulated dark field map for clarity, with added shading to highlight the different sections. FIG. 7(b) illustrates a measured normalized transmission function (dots) and a fitted transfer matrix model (lines). FIG. 7(c) shows extracted values of the modal effective index of the A (dashed line) and B (continuous line) cross-sections. FIG. 7(d) shows the extracted coupling coefficient of the directional coupler versus wavelength, with experimental values (measured from two different microchips) indicated by the lines, and an ab initio simulation based on eigenmode expansion shown by the squares.

Figure 8:
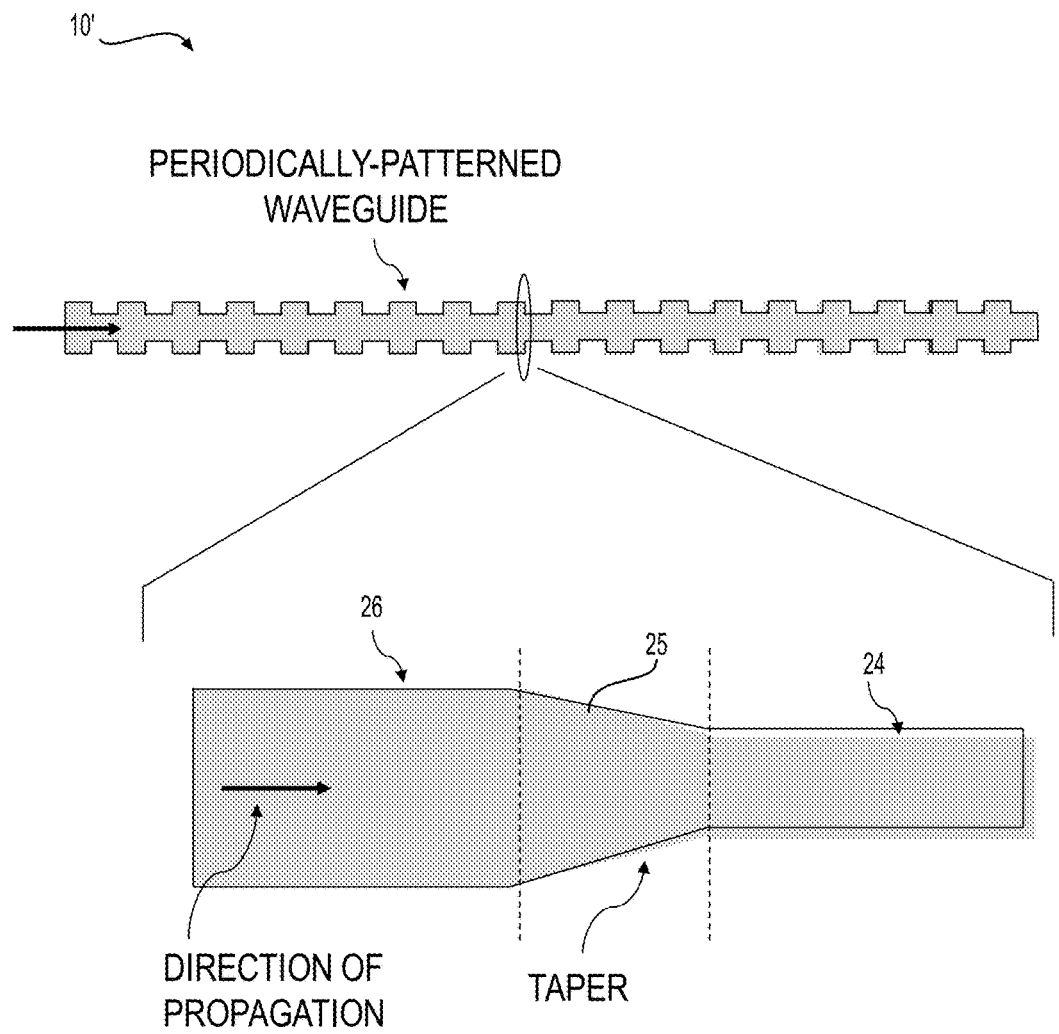
FIG. 8 illustrates a waveguide having a taper.

What has been described are heterogeneous waveguides and methods of manufacture according to present principles. Variations of the above description will be understood. For example, the heterogeneous waveguide may include a periodic pattern that incorporates a waveguide taper, the waveguide taper configured to reduce at least one optical mode-mismatch, the optical mode-mismatch occurring between at least two waveguide sections. Such a waveguide taper 25 is illustrated in the waveguide 10' of FIG. 8.

Accordingly, the invention has been described with respect to certain embodiments, it should be clear to one of ordinary skill in the art, given this teaching, that the invention is much broader than the embodiments shown. That is, the description represents some, but not all, representations, and therefore the scope of this invention is to be limited only by the claims appended to this description.

The invention claimed is:

1. A heterogeneous waveguide configured to achieve nonlinear optical interactions, the heterogeneous waveguide including at least two materials in a cross-section, a first material having a nonlinear optical property for generating at least one new frequency by mixing one or more input optical waves, and a second material being patterned for defining a waveguide mode in the cross-section, the second material configured to achieve phase-matched interactions of waves along a propagation direction, such that optical modes are distributed between the first and second materials.

2. The heterogeneous waveguide of claim 1, wherein the first material exhibits second order nonlinear optical susceptibility.

3. The heterogeneous waveguide of claim 1, wherein the first material is an unpatterned crystal and is not etched, bored, patterned, poled, or modified.

4. The heterogeneous waveguide of claim 1, wherein the first material is periodically poled.

5. The heterogeneous waveguide of claim 1, wherein the pattern of the second material is periodic.

6. The heterogeneous waveguide of claim 1, wherein the heterogeneous waveguide is configured to generate a new optical wave based at least in part on nonlinear optical interactions of at least two of a plurality of input optical waves.

7. The heterogeneous waveguide of claim 1, wherein the first material comprises an unpatterned crystalline thin-film of at least one of the following:
  a. Lithium Niobate (LiNbO3);
  b. Lithium Niobate (Li3NbO4); or
  c. Lithium Tantalate (LiTaO3).

8. The heterogeneous waveguide of claim 1, wherein the second material comprises a thin film of at least one of the following: silica nitride, silicon, silicon dioxide, a compound semiconductor, a polymer, SiC, or a III-V semiconductor selected from the group consisting of: GaAs, GaAlAs, InP, InSb, GaP, GaN, InGaAs, or InGaAsP.

9. The heterogeneous waveguide of claim 1, wherein at least one periodic pattern is configured along the direction of propagation of the input optical waves.

10. The heterogeneous waveguide of claim 9, wherein the at least one periodic pattern comprises a plurality of waveguide sections, wherein at least one of the plurality of waveguide sections comprises at least one of the following:
  a. a discrete height;
  b. a discrete width;
  c. a discrete material structure;
  d. a discrete material composition; or
  e. at least one dopant.

11. The heterogeneous waveguide of claim 9, wherein the at least one periodic pattern comprises at least one waveguide taper, the at least one waveguide taper configured to reduce at least one optical mode-mismatch, the optical mode-mismatch occurring between at least two waveguide sections.

12. The heterogeneous waveguide of claim 1, wherein the heterogeneous waveguide comprises at least one additional material.

13. The heterogeneous waveguide of claim 1, wherein the heterogeneous waveguide is configured to generate at least one new optical or radio frequency based at least in part on two input frequencies.

14. The heterogeneous waveguide of claim 1, wherein the one or more input optical waves corresponds to one of the following:
  a. an independent optical wave; or
  b. a spectral component of an optical pulsed waveform.

15. The heterogeneous waveguide of claim 1, wherein the heterogeneous waveguide is configured to divide at least one spectral component of at least one input optical wave into two or more generated frequencies that are phase matched.

16. The heterogeneous waveguide of claim 1, wherein the heterogeneous waveguide is configured to generate an optical parametric amplification of at least one of a plurality of input optical waves.

17. The heterogeneous waveguide of claim 1, wherein the heterogeneous waveguide is configured to upconvert or downconvert at least one input optical wave.

18. The heterogeneous waveguide of claim 1, wherein the heterogeneous waveguide is configured to generate a frequency comb through difference frequency generation of at least two of a plurality of distinct input optical waves, or at least two spectral components of at least one input optical wave.

19. The heterogeneous waveguide of claim 1, wherein the heterogeneous waveguide is configured to generate at least one radio frequency wave through difference frequency generation of at least two of a plurality of distinct input optical waves or at least two spectral components of at least one input optical wave.

20. A method for fabricating the heterogeneous waveguide of claim 1, wherein the first material is bonded to the second material, and subsequently the second material is patterned.

21. A method for fabricating the heterogeneous waveguide of claim 1, wherein the second material is patterned, and subsequently the first material is bonded to the patterned second material.

* * * * *